US000001815H

United States Statutory Invention Registration [19]

[11] Reg. Number: H1,815

Campbell et al.

[45] Published: Nov. 2, 1999

[54] METHOD OF OFFSHORE PLATFORM CONSTRUCTION USING A TENSION-MOORED BARGE

[75] Inventors: Robert B. Campbell, The Woodlands; Stephen D. Vaughn; John B. Wardell, both of Houston, all of Tex.

[73] Assignee: Exxon Production Research Company, Houston, Tex.

[21] Appl. No.: 08/821,951

[22] Filed: Mar. 24, 1997

[51] Int. Cl.[6] ..... E02D 25/00

[52] U.S. Cl. ..... 405/209; 405/204

[58] Field of Search ..... 405/209, 203–208, 405/195.1–200; 166/350, 338–343, 346, 359, 367; 114/264, 265, 230

[56] References Cited

U.S. PATENT DOCUMENTS

| | | | |
|---|---|---|---|
| 2,612,025 | 9/1952 | Hunsucker | 405/209 |
| 2,907,172 | 10/1959 | Crake | 405/209 |
| 2,934,905 | 5/1960 | Woolslayer et al. | 405/209 |
| 3,036,438 | 5/1962 | Sims | 405/209 X |
| 3,577,946 | 5/1971 | Horton . | |
| 3,589,133 | 6/1971 | Lowd | 405/204 |
| 3,648,638 | 3/1972 | Blenkarn . | |
| 3,780,685 | 12/1973 | Horton . | |
| 4,242,011 | 12/1980 | Karsan et al. | 405/204 |
| 4,252,468 | 2/1981 | Blight | 405/204 |
| 4,252,469 | 2/1981 | Blight et al. | 405/204 |
| 4,648,751 | 3/1987 | Coleman | 405/209 |
| 4,655,641 | 4/1987 | Weyler | 405/204 |
| 4,662,788 | 5/1987 | Kypke et al. | 405/204 |
| 4,690,586 | 9/1987 | Oksuzier | 405/209 |
| 4,714,382 | 12/1987 | Khachaturian | 405/204 |
| 4,729,695 | 3/1988 | Silvestri | 405/209 X |
| 4,744,697 | 5/1988 | Coppans | 405/204 |
| 4,848,967 | 7/1989 | Weyler | 405/204 |
| 4,848,968 | 7/1989 | Coppens | 405/204 |
| 4,930,938 | 6/1990 | Rawstron et al. | 405/204 |
| 4,938,630 | 7/1990 | Karsan et al. | 405/204 X |
| 5,037,241 | 8/1991 | Vaughn et al. | 405/209 |
| 5,219,451 | 6/1993 | Datta et al. | 405/204 |
| 5,237,949 | 8/1993 | Stevens et al. | 114/265 |

FOREIGN PATENT DOCUMENTS

| | | | |
|---|---|---|---|
| 936005 | 10/1973 | Canada | 405/209 |

*Primary Examiner*—Harold J. Tudor
*Attorney, Agent, or Firm*—Marcy M. Lyles

[57] ABSTRACT

A method of installing an integrated deck onto an offshore platform substructure. The integrated deck is held by a support structure on a barge and transported to a preinstalled offshore platform substructure which is adapted to receive the barge and allow aligning of the integrated deck with the substructure for mating operations. Once the barge is positioned within the substructure, tethers are connected between the barge and anchoring foundation elements to moor the barge. Then the tethers are tensioned to minimize both vertical movement and lateral movement caused by wave action. Mating of the integrated deck and the substructure proceeds while tension loads in the tethers are maintained.

15 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF OFFSHORE PLATFORM CONSTRUCTION USING A TENSION-MOORED BARGE

FIELD OF THE INVENTION

The present invention relates generally to construction of marine structures used in offshore petroleum operations. More particularly, but not by way of limitation, the present invention relates to a method of installing an integrated deck structure onto an offshore platform substructure. Specifically, the invention pertains to a method for using a tension-moored barge to minimize wave-induced motion, and damages resulting therefrom, during mating of an integrated deck structure with an offshore platform substructure.

BACKGROUND

In offshore petroleum operations, an offshore platform comprising a trussed steel framework substructure secured to the seafloor with an above-water deck mounted on top is commonly used to drill for and produce oil and gas. The trussed steel framework substructure is commonly referred to as a "jacket".

A traditional approach to constructing an offshore platform is to lift individual components of a deck structure onto a preinstalled jacket with a barge-mounted crane and then to interconnect the components and the jacket. This approach can be quite expensive due to the extensive offshore construction required. Offshore construction costs can be high due to the need for special offshore construction vessels and because of downtime caused by such uncontrollable factors as inclement weather and rough seas. In the case of very large platforms, or platforms located in remote areas, offshore construction may require many months to complete.

In an alternate approach to offshore platform construction, known as the "integrated deck approach", a one-piece deck structure or "integrated deck" is used, with most or all components being integrated at an onshore construction yard. The integrated deck is then transported by a vessel such as a barge to the location of a preinstalled jacket, where the integrated deck and the jacket are mated. By using the integrated deck approach, offshore construction time can be greatly reduced. This not only substantially reduces offshore construction costs, but makes the integrated deck approach attractive for offshore areas having short windows of time suitable for construction due to periods of inclement weather or rough seas.

Typically, an integrated deck is mated to a preinstalled jacket either by the use of cranes on offshore crane vessels or by lowering the deck onto the jacket using a float-on deck setting procedure. The second method involves mounting the deck onto a barge, maneuvering the barge into a slot in the jacket framework, properly aligning the barge/deck combination with the jacket, then lowering the deck until it engages the jacket structure. Typically, the deck is lowered by ballasting the barge; however, alternatively, a deck-lowering mechanism can be incorporated into the barge. The deck load is then transferred to the jacket and the barge is disconnected from the deck and removed from the jacket slot. Such a procedure is described in greater detail in U.S. Pat. No. 4,242,011 (Karsan et al.).

Major complications can arise during the integrated deck/jacket mating procedure, due in large part to significant wave-induced relative vertical motion between the barge-mounted integrated deck and the bottom-founded jacket. The shock of wave-induced contact between the deck and jacket can cause appreciable damage to both structures, resulting in delays in completing construction of the offshore platform and in extra expense to repair or replace any damaged equipment.

Attempts to accommodate the wave-induced motion are described in various U.S. patents. For example, U.S. Pat. No. 5,219,451 (Datta et al.) describes an integrated deck provided with shock absorbing stabbing tip assemblies for engagement with the upstanding columns of a jacket substructure. The stabbing tip assemblies include coaxially arranged locating pins which are dropped into position to restrict lateral movement of the deck relative to the upstanding columns and annular resilient collars for transferring vertical and lateral shock loads between the columns and the deck. U.S. Pat. No. 4,930,938 (Rawstron et al.) describes a deck-to-jacket mating assembly fitted with primary and secondary load transfer devices, wherein both devices utilize compression spring systems for transferring vertical and lateral shock loads between the columns and the deck. U.S. Pat. No. 4,848,967 (Weyler) describes a deck to jacket load transfer system which utilizes a non-linear spring system for a soft response at initial impact which transitions to a stiff response. U.S. Pat. No. 4,655,641 (Weyler) describes the use of a stabbing pin assembly which accommodates for wave-induced lateral movement by use of cantilevered springs which are received by receiving members in the jacket structure. Each receiving member is secured in a manner which permits it to tilt in response to lateral forces applied to the receiving member above its bottom end, but which does not permit the receiving member to tilt in response to lateral forces applied to the receiving member at its bottom end. A resilient member, adapted to apply a restoring force to the receiving member when the receiving member tilts, surrounds each receiving member.

In addition, the well known maritime practice of mooring, for holding a vessel in position within an acceptable range of lateral movement, has been used in association with integrated deck installation procedures. U.S. Pat. Nos. 4,648,751 (Coleman), 4,744,697 (Coppens), and 5,037,241 (Vaughn et al.) all describe the mooring of a barge/vessel in relation to the position of an offshore platform substructure such as a jacket.

As indicated by the foregoing, the offshore petroleum industry has sought to alleviate the problems associated with wave-induced motion during mating of an integrated deck structure to a preinstalled jacket structure with an ever-growing array of load transference and alignment devices. While these devices can enable deck setting procedures in periods of relatively fair weather and calm water, such conditions often do not coincide with an optimum project completion schedule, and the costs associated with such devices can be substantial. In addition, mooring methods as currently utilized do not alleviate the shock load damage potential of current deck installation methods. Therefore, a need exists for a deck setting procedure operable in inclement weather and rough seas.

SUMMARY OF THE INVENTION

The present invention is a method of mating a barge-borne integrated deck with a preinstalled offshore jacket. More particularly, the invention is a method of reducing shock load damage potential associated with mating the integrated deck with the offshore jacket by securing tethers from the barge to foundation elements and then tensioning the tethers so as to reduce wave-induced motions of the barge. U.S. Pat. Nos. 3,577,946 (Horton), 3,648,638 (Blenkarn) and 3,780,685 (Horton), for example, discuss methods for using tensioned mooring to control wave-induced motions of an offshore platform. However, these patents do not disclose or suggest implementation of tensioned mooring to alleviate shock load damage potential associated with installation of an integrated deck onto an offshore jacket.

In the method of the present invention, the barge/deck combination is positioned within a receiving slot in the jacket to approximately align the deck with the jacket onto which it will be installed. Tethers are then secured between the barge and foundation elements. The lower ends of the tethers are connected to the foundation elements either prior to or after positioning of the barge/deck combination in the jacket slot. The upper ends of the tethers are generally connected to the barge/deck combination after it is positioned in the jacket slot, but may be connected to the barge/deck combination before it is positioned in the jacket slot. Once connected to both the barge and the foundation elements, the tethers are tensioned to secure the barge against wave-induced motion.

The barge and deck are then simultaneously lowered, in order to lower the deck onto the jacket. In one embodiment of the present invention, the simultaneous lowering is accomplished by ballasting the barge while simultaneously jacking/lifting on the tethers to maintain the tension loads in the tethers at an approximately constant value. This simultaneous jacking/lifting and ballasting operation continues in a gradual manner until initial contact is made between the bottom of the deck and the top of the jacket. Just before vertical contact is made, interface guides engage to provide proper positioning of the deck in the longitudinal and transverse directions. Final lowering is initiated only when lateral motion shock loads are within the tolerance designed into the jacket interface.

In an alternative embodiment, a lowering method, such as a sand jack system, a system of hydraulic jacks, or other similar system incorporated into the deck-to-barge support system, can be used to lower only the deck while the barge remains stationary. Interface guides are employed, as above, to provide for proper positioning of the deck in the longitudinal and transverse directions.

In both cases, once the deck has engaged the jacket, simultaneous jacking/lifting and ballasting maintains tension in the tethers while the weight of the deck is transferred to the jacket. When the load transfer is complete, the barge is separated from the deck. The jacking/lifting of the tethers is then reversed and ballasting is continued in order to unload tension from the tethers, which are then disconnected. The barge is then removed from the jacket slot, completing the operation.

BRIEF DESCRIPTION OF THE DRAWINGS

The present invention and its advantages will be better understood by referring to the following detailed description and the attached drawings in which.

While the invention will be described in connection with its preferred embodiments, it will be understood that the invention is not limited thereto. On the contrary, the invention is intended to cover all alternatives, modifications, and equivalents which may be included within the spirit and scope of the invention, as defined by the appended claims.

DETAILED DESCRIPTION OF THE INVENTION

The method of installing an integrated deck onto an offshore substructure having a slot in an upper end thereof for receiving a barge carrying the integrated deck, comprises the steps of: (a) positioning the barge within the slot in the offshore substructure such that the integrated deck is approximately aligned with the offshore substructure; (b) installing a plurality of tethers between the barge and a plurality of foundation elements; (c) tensioning the tethers such that the barge is maintained at a deeper draft than would be provided by the buoyancy of the barge alone; (d) lowering the integrated deck to contact the offshore substructure; and (d) ballasting the barge to assist in transferring the weight of the deck onto the offshore substructure.

Figure 1A:
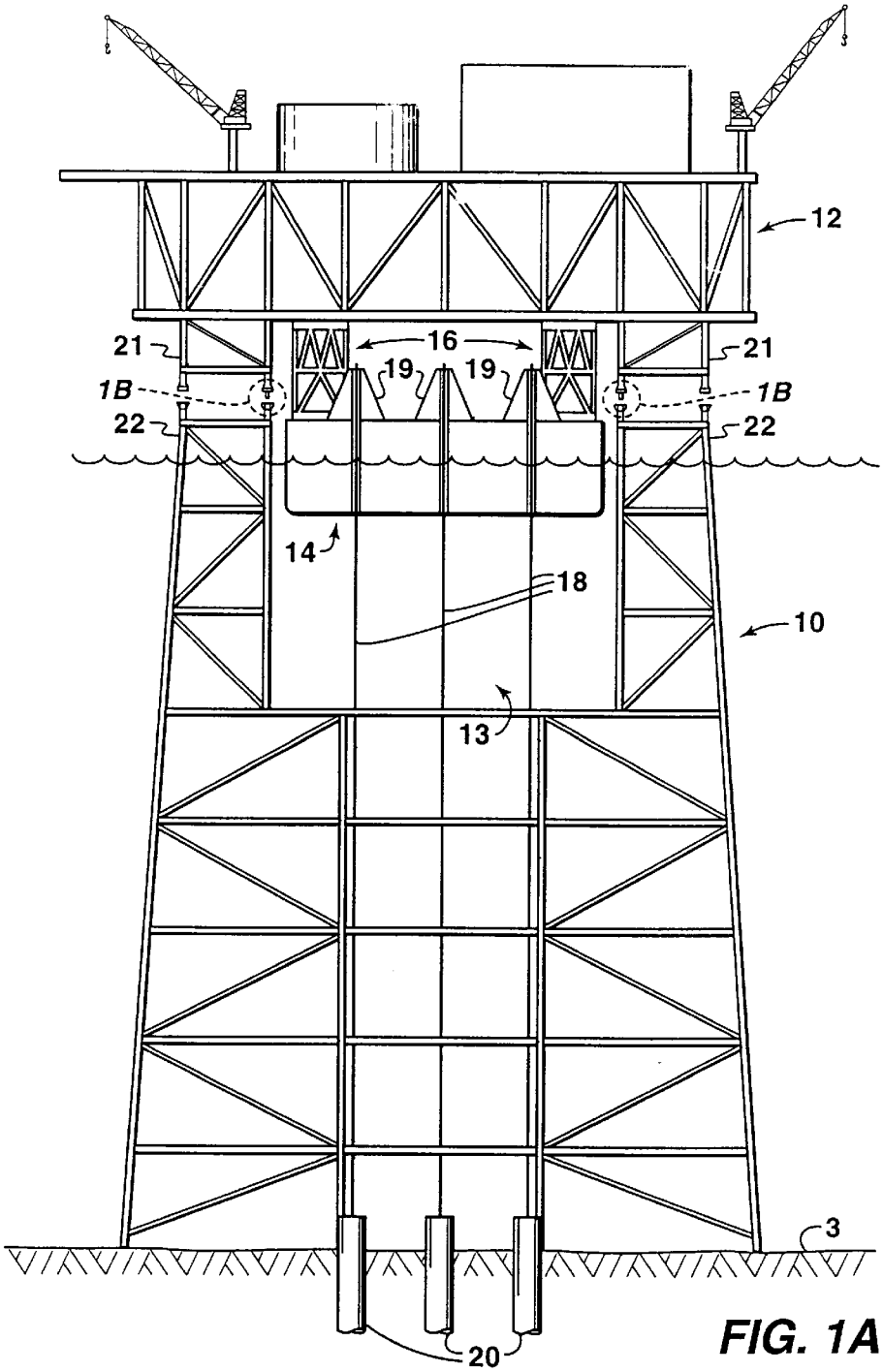
FIG. 1A is a front elevational view of a barge-borne integrated deck positioned within a receiving slot of an offshore jacket with the barge tension-moored to the seafloor.

The method of the present invention can be better understood by reference to FIG. 1A. Although the following discussion will refer to installation of an integrated deck onto a steel "jacket", it will be recognized that the discussion will be equally applicable to installation of any number of deck structures, including without limitation steel and/or concrete deck structures, onto any number of substructures, including without limitation steel, concrete, and/or gravity substructures. An integrated deck 12, supported by a barge 14, is transported to and positioned within the slot 13 of a jacket 10 fixed to the seafloor 3. The deck 12 includes drilling, hydrocarbon processing, and other equipment as required for a particular application. The barge 14 may be any suitable vessel known to those skilled in the art for transporting the integrated deck 12 to the jacket 10. The integrated deck 12 is connected to the barge 14 by a deck-to-barge support system 16. The integrated deck 12 has a plurality of downwardly extending deck legs 21 designed to mate with corresponding, upwardly extending jacket legs 22.

Figure 2:
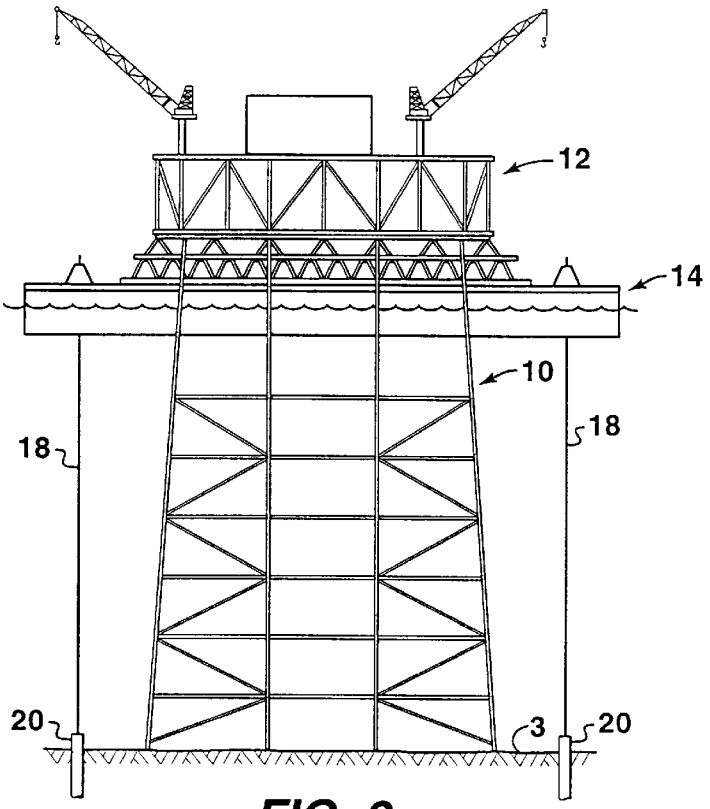
FIG. 2 is a side elevational view of a barge-borne integrated deck positioned within a receiving slot of an offshore jacket with the barge tension-moored to the seafloor.
Figure 3:
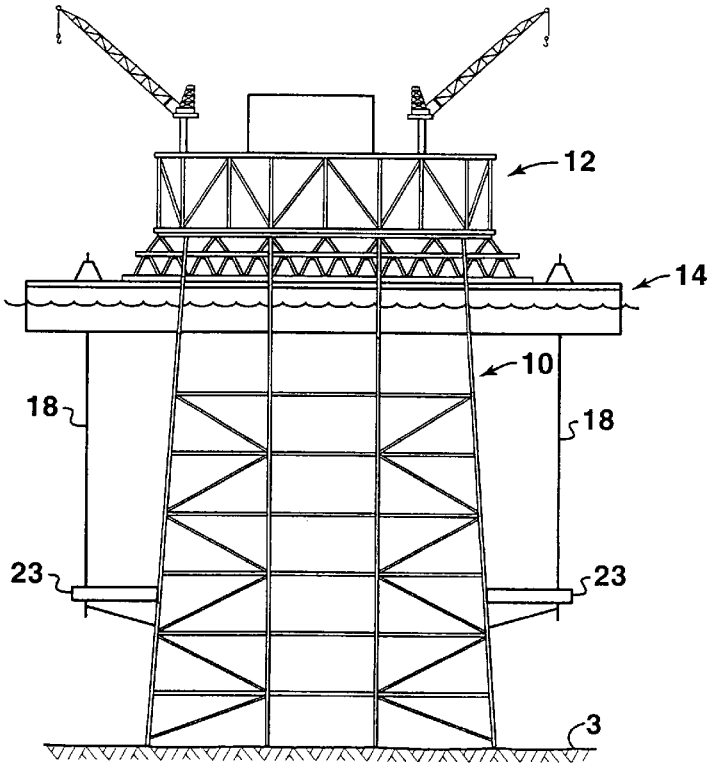
FIG. 3 is a side elevational view of a barge-borne integrated deck positioned within a receiving slot of an offshore jacket with the barge tension-moored to tether base structures attached to the jacket.

The barge 14/integrated deck 12 combination is maneuvered into the slot 13 of the jacket 10, providing for appropriate vertical and lateral clearances, and is positioned so as to approximately align the deck legs 21 with their corresponding jacket legs 22. Tethers 18 are then connected between the barge 14 and foundation elements. The foundation elements can be special purpose foundation elements such as the anchor piles 20 embedded into the seafloor as shown in FIG. 1A and FIG. 2. Alternatively, the foundation elements can be a part of the jacket structure, such as the tether base structures 23 attached to the jacket 10 as shown in FIG. 3; or other structures, such as skirt piles 25 (shown in FIG. 4) can serve as foundation elements.

Figure 4:
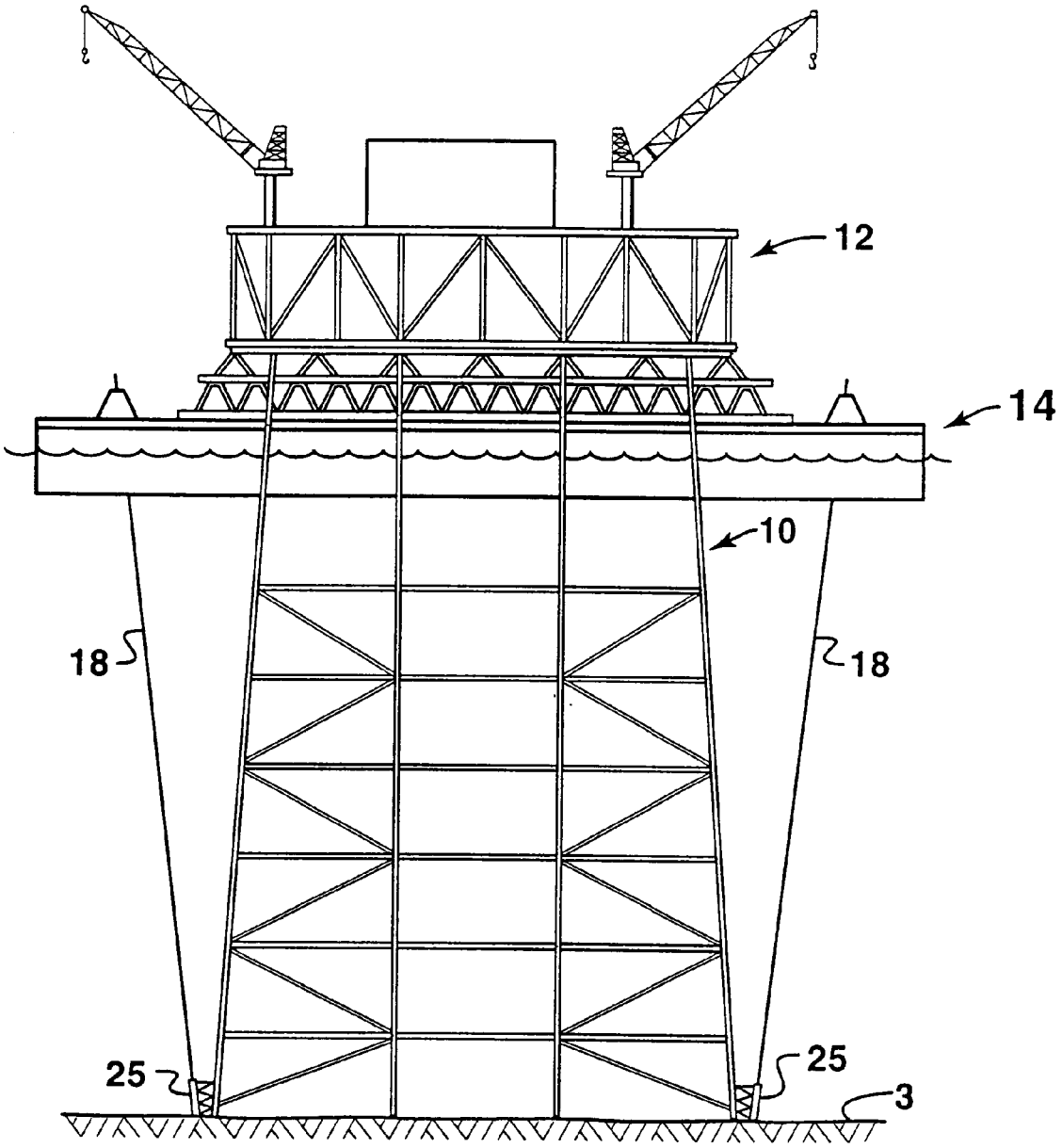
FIG. 4 is a side elevational view of a barge-borne integrated deck positioned within a receiving slot of an offshore jacket with the barge tension-moored to skirt piles attached to the jacket.

Referring again to FIG. 1A, the tethers 18, are connected to foundation elements such as anchor piles 20, and then fixed to the barge 14 at tether supports 19 incorporated into the barge 14. Alternatively, the tethers 18 can be connected to the foundation elements before the arrival of the barge 14 and then connected to the barge 14 after its arrival. Preferably, jacking/lifting devices (not shown) are incorporated into the tether connections for use in controlling the tension loads in the tethers. Once the tethers 18 are connected to both the barge 14 and the foundation elements, the position of the tethers 18 may be vertical (FIGS. 1A, 2, and 3) or inclined from vertical (FIG. 4).

During the positioning of the barge 14, the barge 14 is preferably ballasted so that the barge 14/integrated deck 12 combination can be tensioned by subsequent deballasting. If ballasted during the positioning procedure, the barge 14 is then deballasted, increasing the tension loads on the tethers 18, such that vertical wave-induced motion is minimized and lateral wave-induced motion is limited. The integrated deck 12 can then be lowered onto the jacket 10, with minimum impact from wave-induced motion, using any suitable procedure. Alternatively, the tethers 18 may be tensioned with jacking/lifting devices incorporated into the tether connections.

Figure 1B:
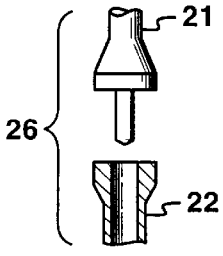
FIG. 1B and FIG. 1C are sketches illustrating how interface guides engage to align deck legs to jacket legs.
Figure 1C:
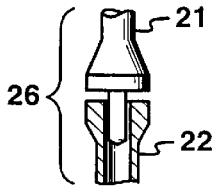

In one embodiment of the invention, both the barge 14 and integrated deck 12 are lowered together. The tethers 18 are jacked/lifted to force the barge 14 downward while the barge 14 is simultaneously ballasted, so as to maintain the tension loads in the tethers 18 at an approximately constant value. The jacking/lifting and ballasting continues so as to lower the integrated deck 12 gradually towards the jacket 10. Prior to vertical contact between the deck legs 21 and the jacket legs 22, interface guides 26 (see FIG. 1B and FIG. 1C) are engaged to properly align the deck legs 21 to the jacket legs 22 in the longitudinal and transverse directions. Final lowering of the integrated deck 12 to the jacket 10 commences when the shock loads associated with lateral motions of the barge 14 are within the structural tolerance of the jacket legs 22. After the deck 12 engages the jacket 10, the tethers 18 are jacked/lifted and the barge 14 is ballasted to maintain tension loads in the tethers 18, thus still minimizing wave-induced motions during transfer of weight of the integrated deck 12 to the jacket 10. When the load transfer is completed, the barge 14 is disconnected from the integrated deck 12 by disconnect means, such as spacer/drop blocks (not shown) incorporated into the deck-to-barge support system. Jacking/lifting of the tethers 18 is reversed and ballasting of the barge 14 continues, thus unloading tension from the tethers 18. The tethers 18 are then disconnected from the tether supports 19 and the barge 14 is maneuvered out of the jacket slot 13.

In an alternate embodiment, the integrated deck 12 alone is lowered while the barge 14 draft remains unchanged. A jack system (not shown), such as a sand jack system or hydraulic jack system, incorporated into the deck-to-barge support system 16 gradually lowers the integrated deck 12 towards the jacket 10. Prior to vertical contact between the deck legs 21 and the jacket legs 22, the interface guides 26 are engaged to properly align the deck legs 21 to the jacket legs 22 in the longitudinal and transverse directions. Final lowering of the integrated deck 12 to the jacket 10 commences when the shock loads associated with lateral motions of the barge 14 are within the structural tolerance of the jacket legs 22. After the integrated deck 12 is sufficiently lowered by the jack system to engage the jacket 10, the tethers 18 are jacked/lifted as necessary and the barge 14 is ballasted to maintain tension loads in the tethers 18, thus still minimizing wave-induced motions during transfer of the weight of the integrated deck 12 to the jacket 10. When the load transfer is completed, the barge 14 is disconnected from the integrated deck 12 by disconnect means such as spacer/drop blocks incorporated into the deck-to-barge support system. Jacking/lifting of the tethers 18 is reversed and ballasting of the barge 14 continues, thus unloading tension from the tethers 18. The tethers 18 are then disconnected from the tether supports 19 and the barge 14 is maneuvered out of the jacket slot 13.

The alignment-aiding, load transfer method of the present invention provides an effective means for mating an integrated deck with an offshore substructure. The method reduces the possibility of shock load damage by minimizing the shock loads associated with wave-induced motion, rather than attempting to compensate for it. In addition, the above-described method should effect a significant reduction in the installation time of an integrated deck, thereby reducing the cost of the operation and making such float-on deck setting procedures possible in areas given to extended periods of adverse weather with relatively short windows of opportunity for performing such a procedure.

The present invention is subject to variations, modifications, and changes in detail, and it is therefore intended that all subject matter discussed above and shown in the accompanying drawings be interpreted as illustrative and not in a limiting sense. For example, the method could be used to mate an integrated deck to a gravity base substructure, or to a tension leg platform substructure, or in any instance where a platform substructure is secured to the seafloor. Any such variations, modifications, and changes in detail are included within the scope of the present invention as defined by the following claims.

We claim:

1. A method of installing an integrated deck onto an offshore platform substructure having a slot in an upper end thereof for receiving a barge carrying said integrated deck, comprising the steps of:

(a) positioning said barge within said slot in said offshore platform substructure such that said integrated deck is approximately aligned with said offshore platform substructure;

(b) installing a plurality of tethers between said barge and a plurality of foundation elements;

(c) tensioning said tethers such that said barge is maintained at a deeper draft than would be provided by the buoyancy of said barge alone;

(d) lowering said integrated deck to contact said offshore platform substructure; and (e) ballasting said barge to assist in transferring the weight of said deck onto said offshore platform substructure.

2. The method of claim 1, wherein said method further comprises the steps of:

(f) disconnecting said integrated deck from said barge;

(g) disconnecting said tethers from said barge; and (h) removing said barge from said slot in said offshore platform substructure.

3. The method of claim 1, wherein said step (b) is replaced with the step of:

(b) installing a plurality of tethers between said barge and a plurality of anchor piles driven into the seafloor.

4. The method of claim 1, wherein said step (b) is replaced with the step of:

(b) installing a plurality of tethers between said barge and a plurality of tether base structures incorporated into said offshore platform substructure.

5. The method of claim 1, wherein said tethers are tensioned by deballasting said barge.

6. The method of claim 1, where said tethers are tensioned by jacking against said barge.

7. The method of claim 1, wherein said integrated deck structure is lowered onto said offshore platform substructure by simultaneous ballasting of said barge and jacking of said tethers against said barge.

8. The method of claim 1, wherein said integrated deck structure is supported on said barge by a deck-to-barge support system and is lowered by lowering means incorporated into the deck-to-barge support system.

9. The method of claim 1, wherein said integrated deck structure is supported on said barge by a deck-to-barge support system and is lowered by a plurality of sand jacks incorporated into the deck-to-barge support system.

10. The method of claim 1, wherein said integrated deck structure is supported on said barge by a deck-to-barge support system and is lowered by a plurality of hydraulic jacks incorporated into the deck-to-barge support system.

11. A method of installing an integrated deck onto an offshore platform substructure, comprising a steel jacket substructure anchored to the seafloor, and having a slot in an upper end thereof for receiving a barge carrying said integrated deck, said method comprising the steps of:

(a) positioning said barge within said slot in said offshore platform substructure such that said integrated deck is approximately aligned with said offshore platform substructure;

(b) installing a plurality of tethers between said barge and a plurality of foundation elements;

(c) tensioning said tethers such that said barge is maintained at a deeper draft than would be provided by the buoyancy of said barge alone;

(d) lowering said integrated deck to contact said offshore platform substructure; and (e) ballasting said barge to assist in transferring the weight of said deck onto said offshore platform substructure.

12. A method of installing an integrated deck onto an offshore platform substructure, comprising a gravity base substructure resting on the seafloor, and having a slot in an upper end thereof for receiving a barge carrying said integrated deck, said method comprising the steps of:

(a) positioning said barge within said slot in said offshore platform substructure such that said integrated deck is approximately aligned with said offshore platform substructure;

(b) installing a plurality of tethers between said barge and a plurality foundation elements;

(c) tensioning said tethers such that said barge is maintained at a deeper draft than would be provided by the buoyancy of said barge alone;

(d) lowering said integrated deck to contact said offshore platform substructure; and (e) ballasting said barge to assist in transferring the weight of said deck onto said offshore platform substructure.

13. A method of installing an integrated deck onto an offshore platform substructure, comprising a tension leg platform substructure tension-moored to the seafloor, and having a slot in an upper end thereof for receiving a barge carrying said integrated deck, said method comprising the steps of:

(a) positioning said barge within said slot in said offshore platform substructure such that said integrated deck is approximately aligned with said offshore platform substructure;

(b) installing a plurality of tethers between said barge and a plurality of foundation elements;

(c) tensioning said tethers such that said barge is maintained at a deeper draft than would be provided by the buoyancy of said barge alone;

(d) lowering said integrated deck to contact said offshore platform substructure; and (e) ballasting said barge to assist in transferring the weight of said deck onto said offshore platform substructure.

14. A method of installing an integrated deck onto an offshore platform substructure having a slot in an upper end thereof for receiving a barge carrying said integrated deck, comprising the steps of:

(a) positioning said barge within said slot in said offshore platform substructure such that said integrated deck is approximately aligned with said offshore platform substructure;

(b) installing a plurality of tethers between said barge and a plurality of foundation elements;

(c) tensioning said tethers such that said barge is maintained at a deeper draft than would be provided by the buoyancy of said barge alone;

(d) lowering said integrated deck to contact said offshore platform substructure;

(e) transferring the weight of said deck onto said offshore platform substructure; and (f) removing said barge from said slot in said offshore platform substructure.

15. The method of claim 14, wherein step (f) comprises:

(a) disconnecting said integrated deck from said barge; and (b) disconnecting said tethers from said barge.

* * * * *